United States Patent
Alpert

(10) Patent No.: US 9,705,606 B2
(45) Date of Patent: Jul. 11, 2017

(54) DIRECTIONAL LIGHT TRANSMITTER AND RECEIVER

(75) Inventor: Ortal Alpert, Jerusalem (IL)

(73) Assignee: WI-Charge, Ltd., Jerusalem (IL)

( * ) Notice: Subject to any disclaimer, the term of this patent is extended or adjusted under 35 U.S.C. 154(b) by 1385 days.

(21) Appl. No.: 12/088,385

(22) PCT Filed: Sep. 27, 2006

(86) PCT No.: PCT/IL2006/001131
§ 371 (c)(1),
(2), (4) Date: Jun. 3, 2008

(87) PCT Pub. No.: WO2007/036937
PCT Pub. Date: Apr. 5, 2007

(65) Prior Publication Data
US 2009/0103925 A1    Apr. 23, 2009

Related U.S. Application Data

(60) Provisional application No. 60/720,648, filed on Sep. 27, 2005.

(51) Int. Cl.
*H04B 10/00* (2013.01)
*H04B 10/80* (2013.01)

(52) U.S. Cl.
CPC .................. *H04B 10/807* (2013.01)

(58) Field of Classification Search
USPC .................................. 398/169–170
See application file for complete search history.

(56) References Cited

U.S. PATENT DOCUMENTS

| 514,168 A | 2/1894 | Tesla |
| 593,138 A | 11/1897 | Tesla |
| 685,955 A | 9/1899 | Tesla |

(Continued)

FOREIGN PATENT DOCUMENTS

EP        0734110        9/1996

OTHER PUBLICATIONS

Zhiguang Xu et al., "Adjustment free cat's eye cavity HE—Ne laser and its outstanding stability" (Optics Express 5565 vol. 13, No. 14 published Jul. 11, 2005).

(Continued)

*Primary Examiner* — Agustin Bello
(74) *Attorney, Agent, or Firm* — Fish & Richardson P.C.

(57) ABSTRACT

A system for supplying power wirelessly to a remote mobile device including (i) a transmitting unit for directing radiation into the region of the mobile device, the transmitting unit having a gain medium with a front surface directed towards the space, and a retroreflector on its back surface, and (ii) a receiver unit connected with or attached to the mobile device for receiving radiation transmitted from the transmitting unit. The receiver unit includes (i) a retroreflector for reflecting part of the radiation received from the transmitting unit back in the direction of the transmitting unit, where it is amplified and retransmitted back in the direction of the receiver unit, and (ii) a power detection element for absorbing that part of the radiation not reflected by the retroreflector, and converting it to electrical power for use by the mobile device. Modulation of the transmitted beam enables it to transmit data also.

39 Claims, 3 Drawing Sheets

(56) References Cited

U.S. PATENT DOCUMENTS

| | | | |
|---|---|---|---|
| 649,621 A | 5/1900 | Tesla | |
| 685,593 A | 10/1901 | Frankling | |
| 685,954 A | 11/1901 | Tesla | |
| 685,956 A | 11/1901 | Tesla | |
| 685,957 A | 11/1901 | Tesla | |
| 685,958 A | 11/1901 | Tesla | |
| 787,412 A | 4/1905 | Tesla | |
| 1,119,732 A | 12/1914 | Tesla | |
| RE26,548 E * | 3/1969 | Thomas | 398/131 |
| 3,566,126 A * | 2/1971 | Lang et al. | 398/170 |
| 4,114,151 A * | 9/1978 | Denne et al. | 342/44 |
| 4,131,791 A * | 12/1978 | Lego, Jr. | 398/171 |
| 4,143,263 A * | 3/1979 | Eichweber | 398/170 |
| 4,209,689 A * | 6/1980 | Linford et al. | 398/157 |
| 4,361,911 A * | 11/1982 | Buser et al. | 398/171 |
| 4,662,003 A * | 4/1987 | Eichweber | 398/170 |
| 4,731,879 A * | 3/1988 | Sepp et al. | 398/170 |
| 4,742,573 A * | 5/1988 | Popovic | 398/171 |
| 4,777,660 A * | 10/1988 | Gould et al. | 398/170 |
| 4,866,781 A * | 9/1989 | Borken et al. | 382/103 |
| 4,983,021 A * | 1/1991 | Fergason | 349/1 |
| 5,023,477 A * | 6/1991 | Valley et al. | 359/326 |
| 5,117,301 A * | 5/1992 | Tsumura | 398/170 |
| 5,121,242 A * | 6/1992 | Kennedy | 398/170 |
| 5,193,201 A * | 3/1993 | Tymes | 708/191 |
| 5,251,221 A | 10/1993 | Stultz et al. | |
| 5,299,046 A * | 3/1994 | Spaeth et al. | 398/135 |
| 5,528,409 A * | 6/1996 | Cucci et al. | 398/15 |
| 5,627,853 A | 5/1997 | Mooradian et al. | |
| 5,819,164 A * | 10/1998 | Sun et al. | 455/106 |
| 5,926,494 A * | 7/1999 | Pepper | 372/70 |
| 6,025,060 A * | 2/2000 | Meissner | 428/220 |
| 6,339,605 B1 * | 1/2002 | Vetrovec | 372/35 |
| 6,381,055 B1 | 4/2002 | Javitt et al. | |
| 6,388,803 B1 * | 5/2002 | Knox | 359/337.1 |
| 6,407,535 B1 | 6/2002 | Friedman et al. | |
| 6,493,123 B1 * | 12/2002 | Mansell et al. | 398/169 |
| 6,600,767 B1 | 7/2003 | Lefevre et al. | |
| 6,624,916 B1 * | 9/2003 | Green et al. | 398/169 |
| 6,721,539 B1 * | 4/2004 | O'Brien et al. | 455/41.1 |
| 6,798,716 B1 | 9/2004 | Charych | |
| 6,906,495 B2 | 6/2005 | Cheng et al. | |
| 7,075,054 B2 * | 7/2006 | Iwamoto et al. | 250/221 |
| 7,085,303 B2 * | 8/2006 | Hunt et al. | 372/101 |
| 7,224,905 B2 * | 5/2007 | Ruggiero | 398/170 |
| 7,263,297 B2 * | 8/2007 | Verbana | 398/201 |
| 7,360,703 B2 * | 4/2008 | McIntyre et al. | 235/454 |
| 7,602,485 B2 * | 10/2009 | Mori | 356/239.2 |
| 7,603,041 B2 * | 10/2009 | Varshneya et al. | 398/170 |
| 7,609,249 B2 * | 10/2009 | Fouquet et al. | 345/156 |
| 7,693,426 B2 * | 4/2010 | Pease | 398/170 |
| 7,720,388 B2 * | 5/2010 | Varshneya et al. | 398/137 |
| 2002/0071627 A1 | 6/2002 | Smith et al. | |
| 2003/0106991 A1 * | 6/2003 | Klotz et al. | 250/221 |
| 2003/0223756 A1 | 12/2003 | Tatum et al. | |
| 2003/0227681 A1 * | 12/2003 | Currie | 359/529 |
| 2004/0008405 A1 * | 1/2004 | Pelouch et al. | 359/341.3 |
| 2004/0165884 A1 | 8/2004 | Al-Chalabi | |
| 2008/0085126 A1 * | 4/2008 | Kokkinos | 398/171 |
| 2008/0285614 A1 * | 11/2008 | Verdeyen et al. | 372/56 |
| 2009/0103925 A1 * | 4/2009 | Alpert | 398/130 |

OTHER PUBLICATIONS

Houssin et al., "Self-aligned exteranal cavity semiconductor lasers for high resolution pectroscopy" (Optics Communications 153 (1998) 73-77.

Hagberg et al., "Single ended output GaAs/AlGaAs single qyantum well laser with dry etched corner reflector", Applied Physics Letter, 56 (20) pp. 1934, published in 1990.

L. Zhou et al., "Corner Cube Retro Reflectors Based on Structure-Assisted Assembly for Free-Space Optical Communication", published in Journal of Microelectromechanical Systems, vol. 12, No. 3 pp. 233-242, Jun. 2003.

Linford et al., "Nd: YAG Long Lasers," Applied Optics, vol. 13, No. 6, pp. 1387-1394 (1974).

Linford et al., "Very Long Lasers," Applied Optics, vol. 13, No. 2, pp. 379-390 (1974).

Extended European Supplementary Search Report of the European Patent Office in corresponding European patent application No. 06796128.4 mailed Aug. 14, 2013.

* cited by examiner

DIRECTIONAL LIGHT TRANSMITTER AND RECEIVER

CROSS REFERENCE TO PRIOR APPLICATIONS

This application is the U.S. national phase of International Application No. PCT/IL2006/001131 filed Sep. 27, 2006, which claims priority from U.S. Patent Application No. 60/720,648 filed Sep. 27, 2005. The international application published in English on Apr. 5, 2007 as WO 2007/036937 A2.

FIELD OF THE INVENTION

The present invention relates to the field of the wireless transmission of power and data to a remote, low power device over free space, in a safe, efficient manner.

BACKGROUND OF THE INVENTION

In recent years many low power mobile devices have come into use. In many cases these devices use a battery to provide electric power, in other cases they draw their power from another device such as a computer (through a USB port for example). Many of these devices are also used to transmit and receive data. Devices that use the Bluetooth protocol are good examples of such devices.

One of the most common drawbacks of such devices is the need for recharge of the battery (in the case of a rechargeable battery) or replacement of the battery (in the case of a non rechargeable battery). Another drawback of such devices, if they are such as to transmit and receive data, is the requirement to transmit data in all directions, to ensure that it will be picked up by the base station, which increases power consumption significantly, as well as increasing any health risks associated with electromagnetic transmissions.

It would be desirable if such devices were able to receive their power, or at least part of it, wirelessly from a remote source, thus reducing the need for recharge cycles or change of batteries. It would also be useful if such devices were able to transmit data directly to the receiver without wasting significant amounts of energy on transmitting it in unwanted directions.

There are shown in the prior art methods of transmitting power through free space without the need for wires. Initial attempts were made by Tesla in the late 19 century. Tesla was able to operate an electric lamp located 25 miles from the power source in Colorado. Tesla induced alternating current to the earth and used a wire to collect the generated AC current and operate a lamp. His invention is described in U.S. Pat. No. 649,621, U.S. Pat. No. 685,593, U.S. Pat. No. 685,954, U.S. Pat. No. 514,168, U.S. Pat. No. 593,138, U.S. Pat. No. 685,955, U.S. Pat. No. 685,956, U.S. Pat. No. 685,957, U.S. Pat. No. 685,958, U.S. Pat. No. 787,412, U.S. Pat. No. 1,119,732

In the beginning of the $20^{th}$ century Yagi in Japan transmitted power using Yagi-Uda antennas making the transmission of power essentially directional. The beam from the Yagi-Uda antenna widens with distance from the antenna reducing the yield of transmission. Yagi's invention is described in various articles. Today other solutions to the problem are attempted. One such example is shown in European patent document No. EP 0734110, for Wireless Power Transmission, to M. Stasys, in which is described the use of a laser or other type of directional energy beam, to transmit power down the beam path from a power source, such as an overhead conductor, to a load, such as an electric tram. This system has some disadvantages. Firstly, if the beam is blocked the radiation continues, in the case of a high energy beam health risk and potential damage to objects crossing the beam's path pose a significant limitation on the use of such a device. Furthermore if a mobile receiver is to be used, a servo mechanism to direct the beam towards the receiver may be needed. There are two significant problems associated with such a servo mechanism, first, it can fail, directing the beam into unwanted places, second it complicates the transmitter and adds to its price.

In U.S. Pat. No. 6,798,716 Charych teaches the use of directional ultrasound for transmission of power. As with the Yagi-Uda antenna the ultrasound beam may require a servo mechanism to direct it to the receiver and the efficiency of the transmission could drop with distance.

Even more recently Cheng et al showed transmission of power using electrical induction (U.S. Pat. No. 6,906,495). Typically the use of such a system would be to transmit energy over very short distances measured in mm and centimeters. Should the same principle be used to transmit power over larger distances, two problems may be encountered, first the efficiency of transmission may drop significantly and second, if a mobile receiver is to be used, a servo mechanism with its associated risks and price may have to be added to the device.

In most of the above methods, the transmitter can transmit power in directions where there is no receiver, the generated radiation may be harmful, especially if it is not blocked by the receiver or if the servo mechanism fails to direct it there. Although servo systems are not described in most of the above systems, should it be used to provide power to a mobile unit, such as a mobile cellular telephone, the beam generated will have to be directed exactly at the receiver.

The receiver too can be equipped with a similar servo mechanism in order to direct the data beam back to the transmitter. However such a mechanism has a number of drawbacks: It has moving parts that may fail over time, with possibly reduced reliability. It can, in error, or due to a fault of the system, hit an object sensitive to the energy beam (such as a human eye) and cause harm to it. Power may be lost due to imperfect direction of the beam, causing inefficiency and further possible damage to the surroundings. It would also be difficult, using a single laser, or an ultrasound or microwave beam, to transmit power to more than one device. Lastly, a directional beam which has no fool proof mechanism to stop it in case the beam is blocked cannot transmit large amounts of power and still meet safety requirements.

Another method to provide wireless power transmission is to have the transmitter transmit energy in all directions, such as by putting a very strong lamp in a room and using a photovoltaic cell to convert the energy to electrical power. However it is the nature of such an isotropic or pseudo-isotropic method of propagating radiation, that the power falls off very quickly with distance, so the power consumption of such a transmitter would need to be high or the range limited. Another drawback of such an approach is the various health hazards and inconveniences.

Therefore, it would be useful to have a combination of a receiver and transmitter for transmitting power and transmitting and receiving data without the need for connecting wires, that overcomes at least some of the disadvantages of the prior art, in that it:
(i) directs a significant amount of the energy transmitted from the transmitter towards the receiver, without need for moving parts, in a situation where the receiver may be able to move around the reception volume;
(ii) has built-in safety features that will turn off the directional transmitted energy beam quickly when it is blocked; and
(iii) is able to send data from the mobile side to the energy transmitter in an energy efficient way.

The disclosures of each of the publications mentioned in this section and in other sections of the specification, are hereby incorporated by reference, each in its entirety.

SUMMARY OF THE INVENTION

The present invention seeks to provide a system and method of supplying energy wirelessly to a portable electrically or optically powered mobile device, in an energy efficient and safe manner. According to the current invention, the transmission is stopped when no receiver is present within a line of sight of the transmitter, and does not require the use of a directional servo system, while providing accuracy in directing the beam from the transmitter to the receiver. The energy is transferred as a safe beam that stops almost instantaneously when there is no line of sight between the receiver and the transmitter.

The system of the present invention preferably comprises two parts—a power transmitter and a power receiver. The power transmitter comprises a light amplifier and a light retro-reflector. The purpose of the light amplifier is to amplify photons received from the receiver and the purpose of the retro-reflector is to reflect those amplified photons back to the receiver, preferably through the amplifier which will amplify them even more. Such an amplifier can be in the form of a laser gain medium (such as Nd+YAG, Er+YAG, or a semiconductor such as GaAlAs) which is in a population inversion mode, allowing for amplification of the photons passing through.

The receiver comprises a retro-reflector and a light receptor capable of converting light energy into electrical or other energy, such as a photovoltaic cell or of using the light itself as an energy source. Alternatively and preferably, the light receptor may transfer the incident energy for using directly as light energy. The term light, whenever used in this application, is understood to also include radiation outside of the visible spectrum In addition, each of the power transmitter and the power receiver may also comprise data transmission and reception facilities. The data transmission is preferably performed in the power transmitter by modulating the power output at a low modulation level with the data desired to transmit, such that the data signal "rides" on the power transmission radiation. In the power receiver, since there is no active power generation or amplifying device, the data transmission is preferably performed by some form of passive modulation of the stream of photons passing back to the transmission unit, such as by the use of a liquid crystal variable attenuation element. Reception of the data at either end of the link is preferably performed by conventional radiation detection and demodulation techniques, as is known in the art. Another preferable method to transmit data between the transmitter and receiver is to use radio transmission.

The use of a single retro reflector to build an adjustment-free laser cavity is known in the art. A few examples include:

U.S. Pat. No. 6,600,767 to Lefvere which teaches the use of a retro reflector such as corner cube or a cats eye to have a self aligning fibre laser.

U.S. Pat. No. 5,251,221 to Sutorusto which teaches a more complicated technique for making a self aligning Raman laser using retro reflectors.

The article "Adjustment free cat's eye cavity He—Ne laser and its outstanding stability" by Zhiguang Xu et al (Optics Express 5565 Vol 13, No 14 published Jul. 11, 2005) in which the authors describe a He:Ne laser cavity built from a single retro reflector and a single high reflectivity mirror. The authors were able to hold the retro reflector by hand without any mechanical stabilization while maintaining lasing.

The article "Self-aligned external cavity semiconductor lasers for high resolution spectroscopy" (Optics Communications 153 (1998) 73-77), by Houssin et al in which is described a self aligned external cavity diode laser for use in space environments. The large temperature changes and mechanical stresses introduced by space flight requirements dictate a self aligned cavity. Houssin et al add a grating to the setup to allow for frequency selection and use only a single retro reflector (cat's eye).

The article "Single ended output GaAs/AlGaAs single quantum well laser with dry etched corner reflector", Applied Physics Letters, 56 (20) pp 1934, published in 1990, by Hagberg et al describes a semiconductor structure which includes a single corner cube retro reflector facet. However, the device described in this paper is not suitable for transmission and reception of power wirelessly. It does not have transmission and reception units, it may not work if the front mirror does not reflect the beam in the correct direction, and the lasing in such a laser does not stop when the beam is blocked.

The article "Corner Cube Retro Reflectors Based on Structure-Assisted Assembly for Free-Space Optical Communication" by L Zhou et al., published in Journal of Microelectromechanical Systems, Vol. 12, No. 3 pp. 233-242, June 2003, there is described a system which transmits data using a retroreflector. This application differs from the present invention in that the laser is not an external cavity laser, but is a means of using a laser beam to perform free space optical communication.

There is thus provided in accordance with a preferred embodiment of the present invention, a system for transmitting power wirelessly to a remote device disposed in a space, comprising:
(i) a transmitting unit adapted to direct radiation generally into the space, the transmitting unit comprising a gain medium having a front surface adapted to emit radiation generally towards the space, and a rear surface having a retro-reflector in optical association therewith, and
(ii) a receiver unit associated with the device and adapted to receive radiation transmitted from the transmitting unit, and comprising a retro-reflector adapted to retro reflect a first portion of the radiation received from the transmitting unit back in the direction of the transmitting unit, such that the transmitting unit amplifies the radiation reflected back from the receiver unit and retransmits it in the direction of the receiver unit, and adapted to transmit a second portion of the radiation, such that it is utilized by the device.

The receiver unit may also preferably comprise a power adaptor, which could convert the second portion of the radiation to electrical power, in which case, it could preferably be a photoelectric device. Alternatively and preferably, the second part of the radiation could be utilized as optical power.

In accordance with other preferred embodiments of the present invention, the gain medium may preferably be excited electrically or optically.

There is further provided in accordance with yet another preferred embodiment of the present invention, a system as described above, and wherein the transmitting unit is adapted to modulate the radiation transmitted, such that data can be transmitted to the receiver. The transmitted radiation may preferably be modulated either by modulation of the gain medium excitation or by use of a liquid crystal modulator.

In accordance with still another preferred embodiment of the present invention, in the above described system, the receiver unit may be adapted to modulate the radiation reflected therefrom, such that data can be transmitted to the transmitting unit. The reflected radiation may preferably be modulated by use of a liquid crystal modulator.

In accordance with a further preferred embodiment of the present invention, in the above described modulated systems, the adaptor may preferably be used to convert the modulation of the transmitted radiation into a data signal for use by the mobile electronic device.

There is further provided in accordance with still another preferred embodiment of the present invention, a system as described in the previous embodiments and wherein the gain medium comprises a lasing material. The lasing material may preferably be either a rare earth doped glass or a rare earth doped crystal. It may also preferably be any one of Nd:YAG, Ti:Sapphire, Ruby, Er:YAG, Er:Glass or a semiconductor.

In accordance with a further preferred embodiment of the present invention, there is also provided a system as described hereinabove, and wherein at least one of the transmitting and receiving retro-reflectors is a corner-cube retro-reflector or a cat's-eye retro-reflector.

Furthermore, in accordance with yet another preferred embodiment of the present invention, the above described systems may preferably further comprise at least one detector disposed outside of the optical path between the transmitting unit and the receiver unit, the detector being operative to cut off the radiation if a predetermined level of change of the transmitted radiation is detected.

In accordance with a further preferred embodiment of the present invention, in any of the above-described systems, the transmitter may preferably be adapted to have a limited range, such that the time elapsing before the radiation is stopped by an intruding object in the path between the transmitting unit and the receiver unit is limited accordingly. In such a case, the time elapsing is determined by the round-trip travel time of the radiation between the transmitter unit and the receiver unit. The limited range is preferably generated by the use of at least one retro-reflector adapted to reflect an incident beam in at least one of a focused, defocused, shifted and misaligned state. Alternatively and preferably, the limited range may be generated by active measurement of the receiver distance from the transmitting unit, and use of the measured distance to cut off the radiation when it exceeds the limited range. In all of these embodiments, the system is laser safe. In this situation, laser safety goggles are not required.

In accordance with yet more preferred embodiments of the present invention, any of the above mentioned systems may further comprise at least one beam blocking arrangement, disposed relative to at least one of the transmitting unit and receiver unit such that reflections from surfaces within any one of the transmitting unit and the receiver unit are not emitted into the space. Such a beam blocking arrangement ensures that any beam reflected in a direction not collinear with the receiver and transmitter units is blocked.

There is further provided in accordance with yet another preferred embodiment of the present invention, a wireless power transmitter as described in any of the above embodiments, and wherein the gain medium is modulated at a predetermined frequency, such that its gain is switched between a higher and a lower value at the modulation frequency, such that a receiver unit located at a characteristic distance from the transmitter unit such that the round trip optical transit time of radiation between the transmitting unit and the receiver unit is equal to the period associated with the modulating frequency, will have a more efficient optical coupling to the transmitting unit than a receiver located at another distance from the transmitting unit. In such a case, the receiver unit located at the characteristic distance from the transmitter unit is mode locked to the transmitting unit. Such mode locking preferably limits optical lasing to between a predetermined receiver and the transmitting unit. In these embodiments, the predetermined receiver may preferably be selected by selection of the modulation frequency.

There is further provided in accordance with still another preferred embodiment of the present invention, a free-space lasing system comprising:
(i) a power transmitting unit comprising a first full retroreflector,
(ii) a power receiver unit comprising a second retroreflector, the power receiving unit being remotely located relative to the transmitting unit,
(iii) a gain medium disposed between the retroreflectors, in close proximity to the first full retroreflector of the power transmitting unit, and
(iv) an element for extracting part of the radiation reflected between the retro reflectors and for utilizing the extracted radiation.

In such a system, the second retroreflector may be either partially reflective, and the element a power detector disposed in the receiving unit for enabling utilization of that part of the radiation received from the transmitting unit and not reflected by the partially reflecting retro reflector, or alternatively, the second retroreflector may be a full reflector, and the element a partially transmissive power detector disposed at the incident surface of the full retroreflector.

In any of the above described embodiments, whether for a system for transmitting power wirelessly, or for a free-space lasing system, the transmitting unit may further comprise a detector for measuring the amount of radiation received, the detector being operative to perform at least one of the decoding of data and the increasing of the safety of the system. The increased safety of the system may preferably be achieved by utilizing the detector to detect a change in the level of radiation outside of the optical path between the transmitting and the receiving units. Furthermore, the receiver unit may further comprise a second detector for measuring the amount of radiation received, the second detector being operative to perform at least one of the decoding of data and the increasing of the safety of the system. The increased safety of the system may preferably be achieved by utilizing the second detector to detect a change in the level of radiation outside of the optical path between the transmitting and the receiving units.

Additionally, in any of these systems, at least one of the transmitting and receiver units may have an optical aperture, and may also preferably comprise at least one beam blocking surface positioned so that reflections from a beam entering the optical aperture are blocked by the at least one beam blocking surface. The optical aperture then has a limited field of view such that it enables entry only of incident beams having an angle of incidence such that reflections of the incident beams impinge on one of the at least one beam blocking surface. The field of view preferably has an angle of at least ten degrees.

In accordance with a further preferred embodiment of the present invention, there is also provided a wireless power transmitter comprising a laser gain medium and a retroreflector, wherein the transmitter is adapted to transmit power wirelessly to a remote receiver unit. The wireless power transmitter preferably has an optical aperture, and also comprises at least one beam blocking surface positioned so that reflections from any beam entering the optical aperture will be blocked by the at least one beam blocking surface. In such embodiments, the system may be constructed such that the maximal power transmission capability may be lower than the limit imposed by any of class 3, or class 2, or class 2m, or class 1 m, or class 1 laser product specifications.

There is also provided in accordance with yet a further preferred embodiment of the present invention, a wireless power transmitter as described herein, and wherein the laser gain medium is modulated at a predetermined frequency, such that its gain is switched between a higher and a lower value at the modulation frequency, such that a receiver unit located at a characteristic distance from the transmitter unit such that the round trip optical transit time of radiation between the transmitting unit and the receiver unit is equal to the period associated with the modulating frequency, will have a more efficient optical coupling to the transmitting unit than a receiver located at another distance from the transmitting unit. The receiver unit located at the characteristic distance from the transmitter unit is then preferably mode locked to the transmitting unit. This mode locking preferably limits optical lasing to between a predetermined receiver and the transmitting unit. The predetermined receiver may be selected by selection of the modulation frequency.

There is even further provided in accordance with a preferred embodiment of the present invention, a wireless power receiver comprising a retro reflector and a light coupler capable of converting optical power into electrical power, wherein the receiver is adapted to receive power wirelessly from a remote transmitter unit. This wireless power receiver may preferably also comprise a wireless data link for transmission of the status of the receiver. The retro reflector may preferably be semi transparent, and may comprise at least one cube corner retro reflector. In such a wireless power receiver, reflections in directions other than 180 degree from the incident beam direction are preferably blocked. Additionally, the retro reflector may be a hollow corner retro reflector, such that undesired surface reflections from the retro reflector are reduced. Any such undesired surface reflections remaining may be minimized by use of anti reflective coatings.

In accordance with a further preferred embodiment of the present invention, there is also provided a method of directing radiation in a system between a transmitting unit having a modulated gain medium, and a receiver unit disposed at a predefined characteristic distance from the transmitting unit, by selecting the modulation frequency such that the round trip optical transit time of radiation between the transmitting unit and the receiver unit is equal to the period associated with the modulating frequency. According to this method, the receiver unit located at the characteristic distance from the transmitter unit is mode locked to the transmitting unit. The round trip optical transit time can preferably be measured, and the measurement may preferably be performed by any one of passive mode locking, frequency scanning and measuring a single pulse round trip optical transit time. The frequency is preferably controlled by a phase locked loop.

Furthermore, in accordance with yet another preferred embodiment of the present invention, there is further provided a method of directing radiation in a system between a transmitting unit capable of lasing at more then a single wavelength, and a receiver unit having a characteristic wavelength response by adapting the transmitting unit to preferentially lase at the characteristic wavelength such that the receiver unit has a more efficient optical coupling to the transmitter than other receiver units having a different characteristic wavelength response.

In such a method, the preferential lasing may be generated by use of a filter set including at least a filter for the characteristic wavelength response of the receiver unit. Alternatively and preferably, the preferential lasing may be generated by changing at least one of the wavelength and power parameters of the pump of the transmitting unit, or by adjusting mechanical placement of parts of the system.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
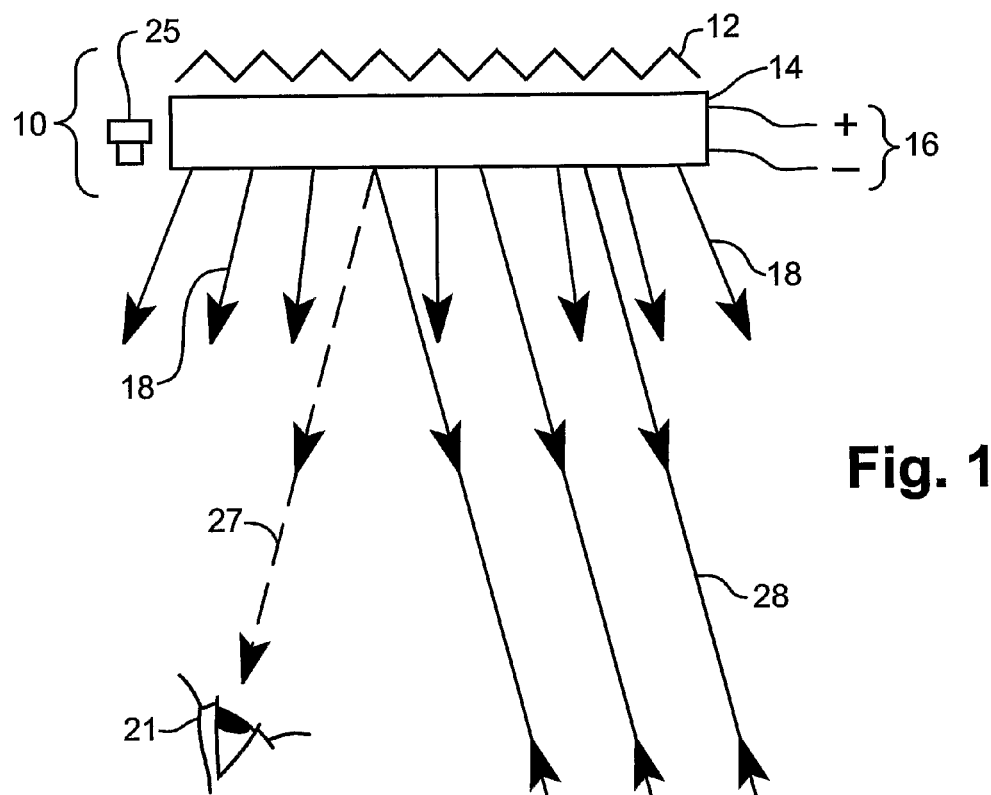
FIG. 1 is a schematic illustration of a complete transmission and reception system, constructed according to a first preferred embodiment of the present invention.

Reference is now made to FIG. 1, which is a schematic illustration of a complete transmission and reception system, constructed according to a first preferred embodiment of the present invention. The transmitter 10, preferably mounted in a position where it can radiate into the whole of the volume to be covered, comprises a 3-dimensional retroreflector array 12, in front of which is disposed a gain material 14, preferably excited by means of an electrical excitation input 16, though other forms of excitation such as optical or chemical pumping can equally be used with suitable gain media. The gain material is preferably provided with antireflection optical coatings to improve its performance, as is known in the art.

When the excitation generates a population inversion in the gain material 14, it will emit photons in all directions 18. In the absence of a receiver, these photons will generally be absorbed by the surroundings, and since their flux level is low, they present no safety hazard.

The receiver 20, preferably mounted on the portable device to be powered, and with a data link connected to the device, comprises a partially reflective retro reflector 22, behind which is mounted a conversion device 24, such as a photovoltaic array, for converting optical power to electricity for use by the mobile device 26. The retroreflector may preferably be built of an array of smaller retroreflectors, each pointing in a different direction, so that the reflectance is more homogeneous as a function of spatial direction.

Some of the photons emitted by the transmitter 10 will statistically be directed towards the receiver 20. These photons impinge on the receiver retroreflector 22, whose optical properties have been selected so that most of the incident photons are reflected back along their incident path 28, and the rest are transmitted through the retroreflector to the photoelectric conversion device 24, where they are converted to electricity for operating the mobile device, or for charging the batteries of the mobile device.

The photons reflected back along their incident path then arrive back at the transmitter 10, where they first pass through the gain medium 14, causing more photons having the same quantum parameters (direction, wavelength, phase, and others) to be emitted, thus amplifying the radiation during this process. This amplified radiation then impinges on the transmitter retoreflector 12, from which it is again reflected back through the gain medium 14 and again amplified, and then back along the path 28 to the receiver, where some of it is again converted into electrical energy and the significant part of it is reflected back towards the transmitter again, such that the whole process is repeated again.

The process continues as long as the amplification of the gain medium is sufficient to make up for the energy extracted from the beam and converted to power in the receiver, and for losses along the way. The system thus behaves like a panoramic, free-space laser, whose cavity extends between the generally fixed position transmitter and the receiver, which may be located anywhere in the region covered by the range of the transmitter, and which can be aligned in almost any direction so long as the retroreflector does have some angular part of its aperture aimed at the transmitter.

Although the embodiment of FIG. 1 shows the converter 24 as a photoelectric converter providing electrical power to a mobile electronic device, the system can also be used to simply deliver optical laser power directly to a remote point where it is needed, without any photoelectric conversion process to electricity. In such a case, the converter 24 could preferably be an optical beam converter for directing the transmitted beam, or part of it, to one or more devices, which then utilize the radiation directly. Such a preferred embodiment could be used to deliver optical power on the floor of hospital operating theatres, or in a cosmetic laser surgery office, eliminating the need for bulky laser resonators, and thus providing a less cluttered environment.

Unlike a closed cavity laser transmitting into the space in which the receiver is located, which may present a serious safety hazard, the open-space cavity of the present invention presents significantly reduced safety hazard. If a foreign object blocks the beam, some of the photons will be absorbed by the object, and if the blockage is sufficient to reduce the overall gain of the laser cavity to below unity, the lasing process will be interrupted, and the beam energy caused to decay almost instantaneously. Thus, if the user's head enters the beam sufficiently for this condition to be fulfilled, the radiation is blocked completely, and no reflected photons will reach the amplifier, thus stopping the directional radiation, and the transmitter will only continue to emit non-coherent photons in all directions, just as a lamp does. By this means, the transmission is generally eye safe, unlike that which would be achieved using a conventional laser, where a blocking eye would be located outside of the cavity, and would not therefore halt the lasing at all when inserted into the beam.

Furthermore, even in situations where only a very small part of the beam is blocked, such that the reduction in overall gain of the laser cavity is not sufficient to automatically interrupt the lasing completely, and some danger may still be present, according to a further preferred embodiment of the present invention, one or more monitor detectors 29 can be disposed in the vicinity of the receiver unit. The function of these monitor detectors is to keep track of any unexpected changes in the radiation pattern around the region of the receiver unit. So long as the lasing is taking place uninterrupted, the detector or detectors 29 will detect the low level of residual radiation scattered out of the beam by the system and its surroundings. The moment any part of the lasing beam is interrupted, even slightly, this scattered radiation level will change, the monitor detector or detectors 29 will detect this change, and the system programmed to cut off the lasing almost instantaneously by shutting off the excitation to the gain material. The shut down can be programmed to last for a suitable time, such as a few seconds, to enable the intruding object to move from the beam path, before the power is restored.

A detector or detectors 25 can also be implemented into the transmitting unit in order to decode data transmitted by the mobile device, or to provide a safety monitor similar to the detector 29 described above in connection with the receiver unit, or both.

Another safety aspect of the present invention is the suppression of beams undergoing undesired reflections from surfaces inside the effective laser cavity. Referring again to FIG. 1, one such exemplary reflection is shown as a ray 27 reflected from the front surface of the gain medium 14, and which is shown entering the eye 21 of a person. Since the power of the intra-cavity radiation 28 is many times higher than the emitted useful power, even if the reflection coefficient of the front surface of the gain medium is reduced to a small fraction of 1%, as is possible with a correctly designed and applied anti-reflection coating, such undesired reflections could be of sufficient power to cause eye damage, or at least to require the safety classification of the system in a higher class than it would have been without the reflections.

The first measure that can be taken to avoid such a risk is to reduce the number of surfaces that may reflect such a beam. For example, the use of prisms as the operative elements in the retroreflectors in the receiver or transmitter units, is not advised because the front surface of the prisms may reflect such a beam. A hollow corner cube retroreflector does not have such a front surface, and thus eliminates such reflected beams, though it may be more difficult to keep clean. Alternatively and preferably, use may be made of cat's eye retroreflectors, as their convex outer surface ensures that any reflected beam has a diverging form.

A second measure is to design the system so that every such surface that may spuriously reflect such a beam is disposed so that the reflected beam would be blocked or attenuated. A preferred embodiment for achieving this is described hereinbelow in FIG. 8.

A third measure is to coat every such surface to reduce reflections therefrom to a minimum.

A fourth measure is to use, where possible optically, surfaces that reflect an uncollimated expanding beam that have a reduced risk, as described for instance in relation to the cat's eye retroreflectors mentioned above.

It is also preferable in some cases to limit the entrance angle to the amplifier so that the reflected beam is reflected in a known direction, which can then be blocked, as described in relation to the embodiment of FIG. 8 hereinbelow.

For safe use, it also is important to limit the power between the transmitter and the receiver and the distance between the transmitter and the receiver so that if the beam is blocked unintentionally by an object that would be damaged by the beam, the energy absorbed by the blocking object would not pose danger to the blocking object.

An additional method of limiting the energy is available by limiting the distance between the transmitter and receiver. If this is done, the maximal time before lasing stops may be calculated by the travel time of the light in the cavity back and forth between the transmitter unit and the receiver unit. The effect of this limited time is that if the beam is blocked, the effective "pulse length" of the beam until lasing is quashed is limited, thus making the potential damage limited, and, where relevant according to safety regulations, ensuring that the "laser pulse" is less than the threshold required for keeping the laser in a safer category. For example, if a pulse shorter than 100 ns is considered to be safer then longer pulses, and ensures inclusion in a safer classification, it would be advisable to limit the distance between the transmitter and receiver to less than 15 meters, as the transit time over this distance would limit the pulse length in the event of a path of sight blockage to 100 ns.

Limitation on the maximal distance can be done by carefully designing the retroreflectors so that beams returned are slightly focused, defocused, shifted or misaligned. Misalignment arises from imperfect performance of the retroreflector, which, instead of returning an incident beam back exactly along its incident path angle, i.e. at 180 degrees from the incident direction, could reflect the beam at an angle with a small deviation from 180 degrees. That way above a certain distance, the beams spot on the transmitter and receiver will be bigger than the retro reflector array and the amount of reflected light will drop below the threshold necessary for lasing. Another possible method to limit the maximal operational distance is to actively measure the distance and add a mechanism to stop lasing if that distance exceeds a certain limit.

Referring now to the specific example of the currently used laser safety classifications, it may be desirable to limit the distance and power of the device so that it meets a certain laser safety class such as class 1 laser, which is, by definition, harmless to humans. Limiting the device in such a way would mean that the safety precautions that the user has to take may be eliminated completely or reduced. General practice is that the lower the laser class the safer the device is. It is preferable to use a class 1 laser over a class 2 laser, and so on.

Laser safety regulations are updated from time to time and are different from country to country but generally, the safest class of laser is the preferable one for use in such a system.

The safety requirements relevant to this invention are laser safety requirements. In most cases the power would be limited to class 1 laser limitations. However in industrial/military/research and other systems, this limitation may be changed if the proper safety precautions are taken. The relevant parameters are among others (depending on exact system design) wavelength, power, maximal distance between the receiver and the transmitter and reflections from different parts of the system The system would be a class one laser product (which is inherently assumed safe) if it does not allow for exposure to levels of laser radiation exceeding the maximal allowed exposure limit for a class 1 laser. Such a system would be inherently safe for consumer use as it presents no bigger hazard than a class 1 laser pointer, and would therefore be the most preferable configuration to use for a device for widespread domestic use. Furthermore, such a laser would not require the inconvenient use of safety goggles.

In embodiments where the gain medium is brought to population inversion by means of an internal laser source, such as is found for a Nd:YAG laser pumped by an 808 nm laser diode, the system is preferably constructed in such a way that, the internal pump laser radiation is not emitted in hazardous levels from the transmitter. This may be achieved by adding a filter which absorbs the pump wavelength or by careful design of the gain medium structure and thickness such that the majority of the pump laser energy is absorbed by the gain medium.

It may be problematic or at least inconvenient to operate two coupled devices, such as the transmitting unit and the receiver unit of the present invention, without them being able to communicate with each other. There is therefore further provided, according to another preferred embodiment of the present invention, a link by which the receiver is able to communicate at least some information to the transmitting unit, and vice versa. Among such information could be messages such as "I am here", "please turn on", "please turn off", "I am receiving X Watts", "I need Y watts" "my serial number is", and so on. This communication link can either be through the modulation data link of the present invention, or it may be a separate wireless channel.

Reference is now made to FIGS. 2 to 6, which illustrate schematically details of further preferred embodiments of the present invention.

Figure 2:
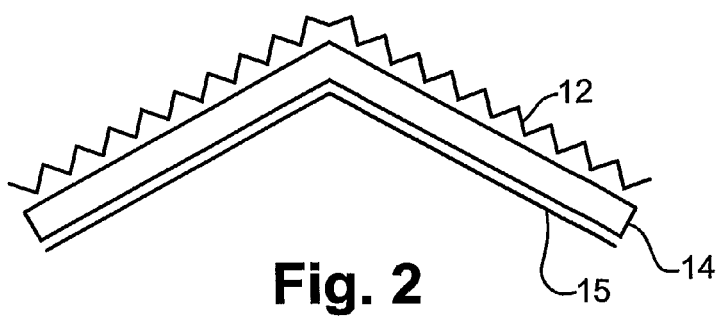
FIG. 2 shows another preferred geometry of the power transmitter of FIG. 1.

In FIG. 2 there is shown another preferred geometry of the power transmitter of FIG. 1 of this application, showing how the use of a folded geometry for the retroreflector 12 and the gain medium 14 is useful for positioning in the corner of a room, such that the volumetric coverage of the receiving space is improved. An optional transparent front cover 15 is shown to illustrate the protection of the transmission unit from damage or environmental pollution.

Figure 3:
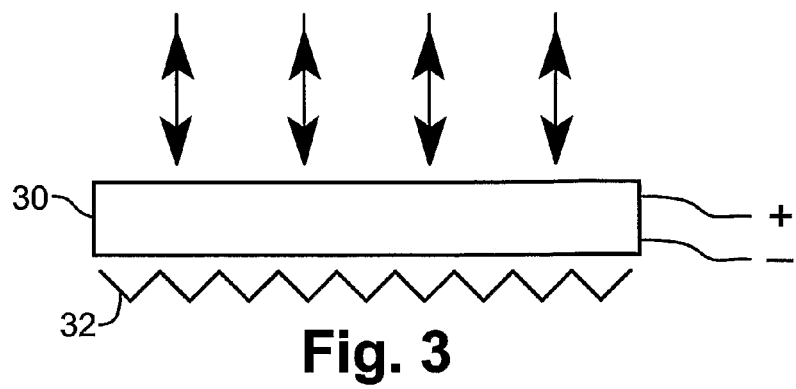
FIG. 3 shows a schematic illustration of an alternative construction for the receiver unit, in which a partially transparent photovoltaic cell is used.

In FIG. 3, there is shown an alternative and preferred construction for the receiver unit, in which a partially transparent photovoltaic cell 30 is used, with the retroreflector 32 behind it to reflect the radiation transmitted through the photocell.

Figure 4:
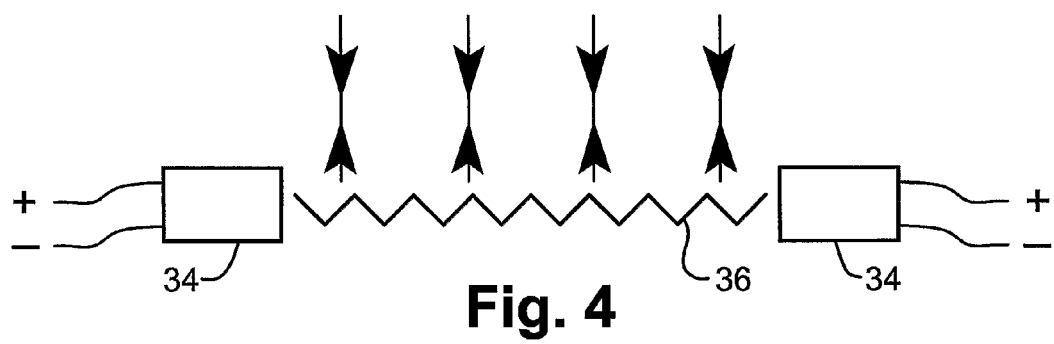
FIG. 4 schematically illustrates another preferred embodiment for the receiver power extraction from the transmitted beam in which the energy converter is arranged around the periphery of the receiver retroreflector.

In FIG. 4, there is shown another preferred embodiment for the receiver power extraction from the transmitted beam. In this embodiment, the energy converter 34, such as a photovoltaic cell, is arranged around the periphery of the receiver retroreflector 36, and operates by absorbing some of the radiation which spills over from the main beam, analogously to the methods used to extract power from unstable resonator high power laser cavities. According to this embodiment of the receiver arrangement, the transmitted beam is not blocked or limited by the power extraction and conversion element 34. Although this element is shown in the embodiment of FIG. 4 to be arranged around the retroreflector, it is to be understood that it can be positioned anywhere in the vicinity of the retroreflector where part of the lasing beam can be detected and extracted from the lasing cavity.

Figure 5:
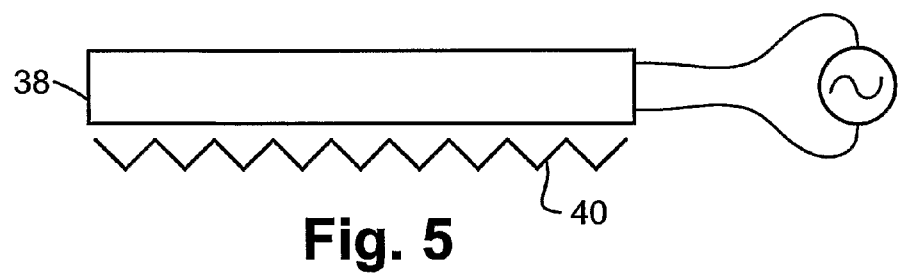
FIG. 5 is a schematic drawing showing how data information may be added to the transmitted beam at the receiver, using a beam modulation device.

In FIG. 5, there is shown a schematic drawing of how data information is added to the transmitted beam at the receiver. A beam modulation device, such as a liquid crystal cell 38, may preferably be positioned in front of the retroreflector 40 (in those embodiments where the retroreflector is at the front of the receiver), and is operative to modulate the light passing through it with the time varying data 42 to be impressed on the transmitted beam. Such a beam modulating device may also be used in the transmitter unit. However, for the transmitter unit, but it may be more convenient to simply modulate the gain material excitation power to impress data onto the beam transmitted to the mobile device.

Figure 6A:
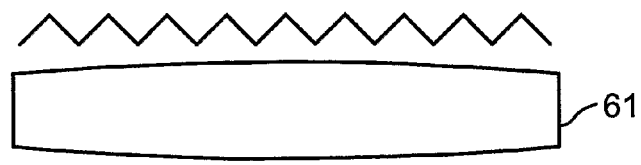
FIGS. 6A and 6B schematically illustrate further preferred retroreflector and gain medium geometries for use in the system of the present invention.
Figure 6B:
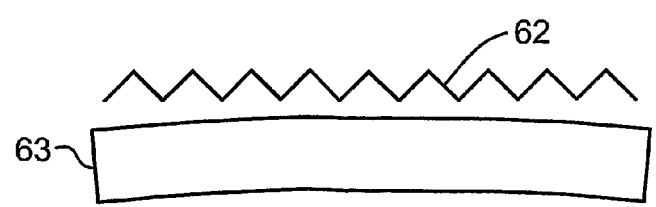

Reference is now made to FIGS. 6A and 6B which show a number of further preferred retroreflector geometries for use in the system of the present invention.

FIG. 6A shows one possible method to limit the maximal operational distance. The gain medium 61 is designed so that its front surface acts like a lens, slightly focusing the reflected beam into the cavity so that when the distance between the transmitter and receiver is significantly longer than the focal length, the beam will have diverged again and lasing conditions will cease to exist. The lens power is shown in FIG. 6A in an exaggerated manner; to schematically illustrate this embodiment.

FIG. 6B shows a further embodiment in which the retroreflector 62 and the gain medium 63 have a concave shape, such that the reflected beam is defocused down the cavity. The curvature is shown in an exaggerated manner also in FIG. 6B, in order to clearly illustrate the form of the embodiment.

There are two common types of retroreflectors, corner-cube retroreflectors and cat's eye retroreflectors, although other types may also be used, such as phase conjugate mirrors, which ensure that even distorted wavefronts are returned in phase conjugation to the incident beam. It is preferable to use a corner-cube type retroreflector for these applications as the divergence of the reflected beam is smaller and the loss of light due to unwanted reflections is lower due to the lower number of surfaces. Surface reflections that may present a safety hazard should be reduced by one of the methods described herein above. This allows for higher gain and more accuracy in the maintenance of the transmission in the correct direction.

Retro-reflectors can be measured by four technical parameters: (i) the field of view (the angles from/to which it is efficient), (ii) the reflectance divergence (the accuracy of retro-reflection), (iii) the efficiency (how much of the light is reflected) and (iv) the shift of the beam (the beam's center may be laterally shifted by a small distance).

For the transmitter retro-reflector 12, it is best to use a very efficient retroreflector (high reflectivity) with as small as possible beam divergence. The field of view of a single cube can be replaced by multiple cubes in different directions. Cubes are therefore the technology of choice as they allow for high efficiency combined with very low divergences.

For the receiver retroreflector 22, the field of view is also important, as well as its weight and volume. Both cube corners and cat eye retro-reflectors may be used as long as the efficiency still allows sufficient amplification of the beam. Cat's eye retro reflectors should be AR coated to increase their efficiency, the reflected beam from the front surface of a cat eye retroreflector is of wide angle and may require in some cases the device to be classified as a class 1m laser product, which is also safe for use.

For both retro-reflectors it is important to reduce the shift of the beam. Therefore the dimensions of the cube or the cat eye must be as small as possible. However features too small will create diffraction problems, so the optimal value is preferably between 100×Wavelength (minimum) and the gain medium diameter.

The optimal laser gain medium 14 should have high gain to enable a small, efficient device.

IR wavelengths are optimal because of ease of conversion to electricity.

The maximal allowed exposure to laser power is different for different wavelengths, such that it is advantageous to use wavelengths that pose less danger. Specifically eye safe wavelengths such as the wavelengths longer than 1400 nm and shorter than 2500 nm are especially advantageous.

Wavelengths that are absorbed or easily scattered by the atmosphere are not advised.

Based on the above wavelength selection guide, wavelengths from 700-2500 nm are most preferred.

Some gain mediums give low gain values per meter. Thus, for instance, HeNe provides approximately 3% (depending on pumping method, pressure, concentration and other parameters) and other gain media may provide higher values. The optical length of the gain medium determines the absolute gain in the medium. This gain has to compensate for the power extracted for use by the device, and optical losses on the way, so in order to achieve a small efficient device, high gain media are preferable. Such high gain media are usually solid state in nature, such as semiconductors used in laser applications, and crystals and glasses doped with rare earth elements such as Neodymium and Erbium, or Tantalum It may be more advantageous to use optical gain media which achieve population inversion by means of direct electrical excitation, and not optical, chemical or other excitation methods, which are achievable, but are more complex to execute.

Lastly, the gain medium should preferably be of low cost. Glasses doped with rare earth are especially preferred as they can be mass manufactured and shaped into various shapes. For all of the above reasons, semiconductor gain media are particularly advantageous.

Small sheets of micro retro reflectors can be produced by injection molding, compression molding or other methods.

The transmitter preferably comprises a retro-reflector made of many small corner reflectors (a device consisting of 3 reflecting surfaces at 90 degrees to each other). The surface of this retro reflector is preferably covered with a sheet of semiconductor gain medium, which could preferably be of GaAlAs, which lases in the infrared. The area of the retro-reflector should be big enough that the dimensions of a single corner reflector are significantly smaller than the dimensions of the transmitter itself, the number of reflecting cubes would preferably be in the range 50-50,000 cubes/surface. The retro-reflecting surface can be made by injection molding or other types of molding or machining methods. Since the exact direction of each retro-reflecting cube is unimportant in determining the effectiveness of the retro-reflection, a large number of such retro-reflecting cubes can be embedded in a supporting matrix by embedding them in a plastic sheet. The device preferably has a light detector for monitoring the amounts of light emitted in directions other than that of the retro-reflectors. These are used to detect the presence of a receiver and to interpret data transmitted by the receiver. In order to operate the transmitter, the gain medium is excited preferably electrically, to create a population inversion and emission of random photons in all directions.

The receiver preferably comprises a similar retro-reflector (of a smaller size) that reflects most, but not all the light back. The portion that passes the retro-reflector is converted to electrical power preferably by a photovoltaic cell, the generated electricity is then stored in a small rechargeable battery to allow for continuity of power for the device even when the transmitter link is broken. In front of the retro-reflector (in data transmitting embodiments) a liquid crystal cell is preferably placed to modulate the amount of reflected light, in order to transmit data.

The retro-reflectors can be replaced with other types of retro-reflectors such as ball retro-reflectors or even 4 wave mixing retro-reflectors. The modulation of light is optional, and is only needed if data is to be transmitted on top of the energy transmitted. The light can be converted to power by voltaic cells or by diodes or by other devices. The battery is optional and is needed only in some cases, such as where the device should continue to operate even if the transmission link back is broken.

Figure 7:
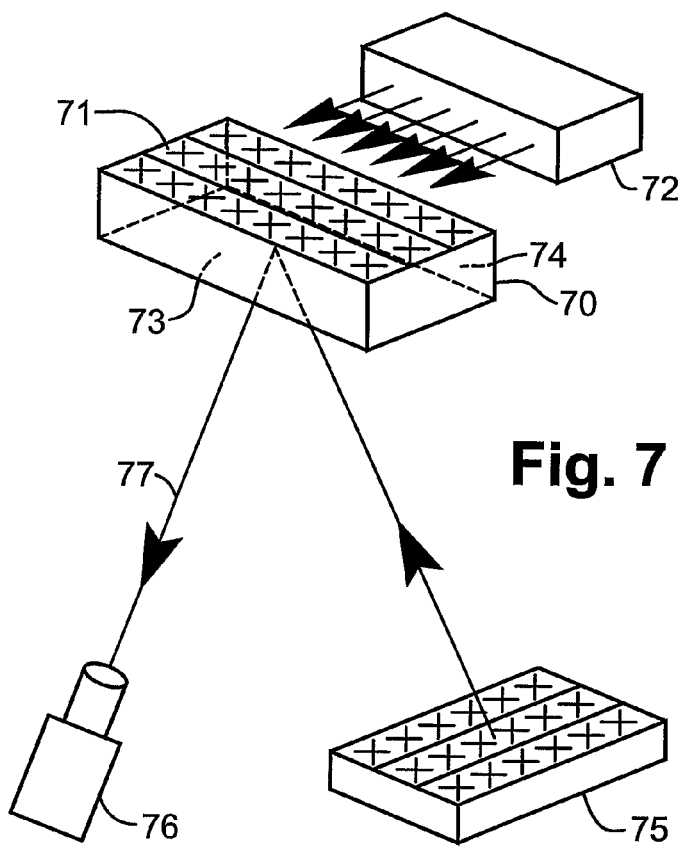
FIG. 7 is a schematic illustration of another preferred embodiment of the present invention using a neodymium doped glass slab as gain medium.

Reference is now made to FIG. 7, which is a schematic illustration of another preferred embodiment of the current invention. A neodymium (or another rare earth) doped glass slab of gain medium 70, is molded in a way that at least one facet of it is shaped like a large number of corner cubes 71. That facet is coated with a highly reflective coating such as protected gold. Another facet 74 of the rare earth doped glass is used for pumping it, preferably using a diode laser 72 of suitable wavelength (~800 nm in the case of Nd). The pumping facet is preferably diffusive to average out the pump power throughout the slab. At least one other facet of the glass 73, opposite to the retroreflector facet 71, is polished to high optical quality and coated with anti reflecting coating.

The pump diode 72 is positioned such that its power is emitted into the glass slab 70, and the power is regulated so that pump power levels posing no danger are emitted through the glass. The glass slab 70 and pump diode 72 are fitted in a box having an entrance aperture and a beam block, arranged in a way that light entering through the aperture, and reflected from the glass surface is blocked by the beam block.

The receiver is made of a semitransparent corner cube retro reflector array made of retroreflecting prisms so that the surface is flat and can be easily cleaned. the front surface the prisms is coated for anti reflection so that reflected beams from it would not pose any danger to the users. The retroreflecting array is fit onto a photoelectric cell converting the light energy into electrical power.

According to a preferred example to illustrate this embodiment, an SDL3470 laser diode, supplied by SDL of San Jose, Calif., USA, lasing at 808 nm was driven by 18.5 Ampere of current supplied by a Lambda LLS 6008 power supply, supplied by Lambda Corporation of San Diego, Calif., USA. The diode is cooled by a water cooling device. The light from the diode is directly coupled to a neodymium doped YLF crystal approximately 30 mm×3 mm×2 mm in size, through its 2 mm facet which is diffusive. The crystal contains a suitable concentration of Nd atoms. An Edmunds Optics retroreflector array Model No. NT47-322 supplied by Edmunds Optics of Barrington, N.J., USA, was placed on one side of the crystal so that it is roughly parallel to the polished surface of the crystal.

This configuration was tested using a hand-held corner cube hollow retroreflector 75, positioned about 1.60 meters from the slab 70. The retroreflector 75 was moved around a distance of approximately 10 cm to the left and right, up and down, and forwards and backwards. Lasing occurs between the retroreflectors and the slab and is detected by a Sony DCR IP7E video camera 76, capable of detecting IR radiation. An attempt to reproduce lasing with a hand held plane mirror resulted in no lasing at all. The undesired spurious reflection 77 from the surface of the slab, directed at the expected surface reflection angle, can also be detected by the camera, although the power can be strong enough to saturate the camera detector.

Figure 8:
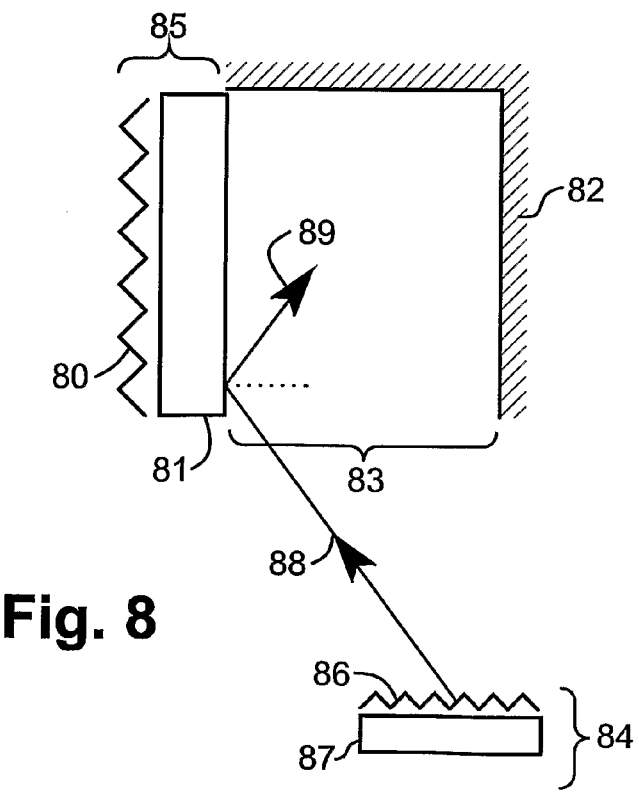
FIG. 8 illustrates schematically a system according to another preferred embodiment of the present invention, by which reflections from the front surface of the gain medium can be blocked such that they do not present a health hazard to persons within the transmission region.

Reference is now made to FIG. 8, which illustrates schematically a system according to another preferred embodiment of the present invention, by which reflections from the front surface of the gain medium can be blocked such that they do not present any health hazard to persons within the transmission region. The transmitting unit 85 is similar to that shown in the embodiment of FIG. 1, and comprises a retroreflector 80, positioned behind a gain medium 81. The transmitting unit is disposed within a shielded enclosure 82, constructed of materials non-reflective to the radiation being emitted. The transmitting unit is positioned such that it preferably faces the enclosure, and a clear aperture 83 in the enclosure, enables the transmitting unit to emit its radiation into the space to be covered. A receiving unit 84, preferably comprising a partially transparent retroreflector 86 and a photovoltaic cell 87, situated within this space, is in optical communication with the transmitting unit 85, as schematically indicated by the beam 88 between the transmitting unit and the receiver. The dimensions of the enclosure and transmitting unit are predetermined such that any radiation incident with a positive angle of incidence on the front face of the gain medium 81, is reflected from that front face, or from any other part of the transmitting unit, at a negative angle as depicted by the ray 89, and will be directed into the enclosure, and absorbed there, such that it cannot be propagated into the space. Beam block 82 blocks all possible reflections at negative angles, such that all reflections of incoming incident beams are blocked.

Use of this blocking embodiment ensures that spurious reflections from surfaces within the transmitting unit cannot cause any harm to persons within the transmission space. Although the transmitting unit is shown in the embodiment of FIG. 8, is directed at right angles to the general direction of the transmission space, and the enclosure is shown having a rectilinear geometry, it is to be understood that the invention is not meant to be limited by this configuration, and that any orientation angle and shape can be used, so long as the geometry of the transmitter and enclosure is arranged that radiation reflected from the front surface of the transmitting unit is not allowed to exit the enclosure. A similar spurious reflection blocking arrangement can also preferably be provided for the receiver unit.

According to a further preferred embodiment of the present invention, a method and apparatus are described for directing the radiation to a specific receiver out of more than one located within the space covered by the transmitting unit.

It will be often necessary to direct the transmitted energy to only a single receiver at any moment. This may be done (among other reasons) in order to
  1. Provide enough power to a device in need
  2. Simplify electronic designs
  3. Not to affect the effective operation of the transmitter 4. Link a transmitter to a receiver.
5. Allow selective use of the device.
6. Save on energy Such a capability may be achieved by adaptation of the transmitter device. The distance of each receiver from the transmitter is usually different, causing the time it takes the light to reach the receiver and return to the transmitter to be different for each receiver. If the gain medium is modulated so that its gain characteristics will be sequentially switched to be higher and lower at the modulation frequency, any receiver that is located at a distance from the transmitter such that the round trip optical transit time of the radiation is equal to the period associated with the modulating frequency, will receive a larger portion of the energy transmitted. Explained alternatively, this is operable since if, at a certain moment in time, the gain is at its maximum, and the modulation frequency is such that the radiation from the transmitter travels to a particular receiver and back again, arriving just when the gain is at its maximum level again, then that particular receiver will be coupled at the optimum efficiency to the transmitter, and over the maximum time interval in correlation with the period of high gain of the gain medium, and will thus receive the optimum level of power. Other receivers, which are not at that characteristic distance from the transmitter, will not be temporally coupled to the maximum gain periods, and so will receive less power.

A non-limiting numerical example is now brought to illustrate this embodiment. Two receivers are used, one at 3 meters from the transmitter and one at 4.5 meters from it. The time taken for radiation to reach the first transmitter is of the order of 10 ns. Hence the time for a full round trip of light is 20 ns. The cycle time for the 4.5 meter receiver is 30 ns. If no modulation is made on the gain of the gain medium, the receiver returning the light more efficiently to the transmitter would be the dominant mode and will receive most of the energy. That could depend both on distance and on receiver orientation relative to the transmitting unit as well as other factors such as dust.

If the gain of the gain medium is modulated at a frequency of $\frac{1}{30}$ ns=33 Mhz, active mode locking will start between the 4.5 m receiver and the transmitter combination, while no model locking will occur between the 3 m receiver and the transmitter combination.

This enables the ability to select a single receiver provided that the corresponding frequencies are known. Determining the frequency corresponding to each receiver can be done in many ways, but of special advantage are four methods utilizing the structure of the transmitter/receiver.

The first method is to build the system so it has passive mode locking capabilities. By that means, the natural frequencies of the system will be generated by the system itself.

The second method is to directly measure the distance of each receiver, by generating a modulated light pulse below the lasing threshold, and measuring the time taken for the pulse to return to the receiver. This is much similar to the way geographical surveys are done using retroreflectors.

The third method is, once initial mode locking has been established with the correct receiver, to frequency modulate the central frequency and to control the central frequency with a Phase-locked loop on the feedback of the gain medium control system.

The fourth method is to scan a range of frequencies, while getting a response back from the different receivers about the amount of power they receive as a function of the transmitted frequencies.

There exist other methods for selecting a single receiver unit. In the case of a gain medium capable of lasing at more than a single wavelength, each receiver may be equipped with a filter, limiting its wavelength response. The transmitter then may be adapted to choose a specific receiver by allowing higher gain for that specific wavelength, for instance, by use of a filter wheel or by changing other parameters of the system, such as pump wavelength or power, mechanical placement of parts or others, such that the desired wavelength is preferentially emitted.

According to another preferred embodiment, spatial filtering may be used, whereby a moving aperture, for instance, is added to the system, and is moved to limit the possible transmission of the system to only a limited predetermined region where the selected receiver is known to be located. Such an aperture can be fitted on the transmitter unit, such as a directional tube or funnel, or on the receiver unit by adding a shutter thereto.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

I claim:

1. A system for transmitting power wirelessly to a remote device disposed in a space, comprising:
a transmitting unit comprising a gain medium having a front surface adapted to emit radiation generally towards said space, and a rear surface having a retro-reflector in optical association therewith, the distance between any two opposing points on opposite edges of said front surface of the gain medium being more than the distance between said front and rear surfaces, such that said radiation can be amplified by said gain medium and emitted from said front surface over a wide range of angles; and
a receiver unit associated with said device and adapted to receive said radiation transmitted from said transmitting unit, and comprising a retro-reflector adapted to retro reflect a first portion of said radiation received from said transmitting unit back in the direction of said transmitting unit, such that said transmitting unit amplifies said radiation reflected back from said receiver unit and retransmits it in the direction of said receiver unit, and adapted to transmit a second portion of said radiation, such that it is utilized by said device.

2. A system according to claim 1 and wherein said receiver unit also comprises a power adaptor converting said second portion of said radiation to electrical power.

3. A system according to claim 2 wherein said adaptor is a photoelectric device.

4. A system according to claim 1 and wherein said second part of said radiation is utilized as optical power.

5. A system according to claim 1 and wherein said gain medium is excited by either one of electrical and optical excitation.

6. A system according to claim 1 and wherein said transmitting unit is adapted to modulate said radiation transmitted, such that data can be transmitted to said receiver.

7. A system according to claim 6 and wherein said transmitted radiation is modulated by either modulation of said gain medium excitation or by use of a liquid crystal modulator.

8. A system according to claim 1 and wherein said receiver unit is adapted to modulate said radiation reflected therefrom, such that data can be transmitted to said transmitting unit.

9. A system according to claim 2 and wherein said adaptor converts said modulation of said transmitted radiation into a data signal for use by said mobile electronic device.

10. A system according to claim 1 and wherein said gain medium is any one of a rare earth doped glass, a rare earth doped crystal, Nd:YAG, Ti:Sapphire, Ruby, Er:YAG, Er:Glass and a semiconductor.

11. A system according to claim 1 and wherein at least one of said retro-reflectors is either one of a corner-cube retro-reflector and a cat's-eye retro-reflector.

12. A system according to claim 1 and further comprising at least one detector disposed outside of the optical path between said transmitting unit and said receiver unit, said detector being operative to cut off said radiation if a predetermined level of change of said transmitted radiation is detected.

13. A system according to claim 1 and wherein said transmitter is adapted to have a limited range, such that the time elapsing before said radiation is stopped by an intruding object in the path between said transmitting unit and said receiver unit is limited accordingly.

14. A system according to claim 13 and wherein said time elapsing is determined by the round-trip travel time of said radiation between said transmitter unit and said receiver unit.

15. A system according to claim 13 and wherein said limited range is generated by either one of the use of at least one retro-reflector adapted to reflect an incident beam in at least one of a focused, defocused, shifted and misaligned state, or by active measurement of the receiver distance from said transmitting unit, and use of said measured distance to cut off said radiation when it exceeds said limited range.

16. A system according to claim 13, and wherein said system is laser safe.

17. A system according to claim 1, and further comprising at least one beam blocking arrangement, disposed relative to at least one of said transmitting unit and receiver unit such that reflections from surfaces within any one of said transmitting unit and said receiver unit are not emitted into said space.

18. A system according to claim 17 and wherein any beam reflected in a direction not collinear with said receiver and transmitter units is blocked.

19. A wireless power transmitter according to claim 1 and wherein said gain medium is modulated at a predetermined frequency, such that its gain is switched between a higher and a lower value at said modulation frequency, such that a receiver unit located at a characteristic distance from the transmitter unit such that the round trip optical transit time of radiation between said transmitting unit and said receiver unit is equal to the period associated with said modulating frequency, will have a more efficient optical coupling to said transmitting unit than a receiver located at another distance from said transmitting unit.

20. A wireless power transmitter according to claim 19 and wherein said receiver unit located at said characteristic distance from said transmitter unit is mode locked to said transmitting unit.

21. A wireless power transmitter according to claim 19 and wherein optical lasing is limited to between a predetermined receiver and said transmitting unit by either one of mode locking or by selection of said modulation frequency.

22. A free-space lasing system comprising:
a power transmitting unit comprising a first retroreflector;
a power receiver unit comprising a second retroreflector, said power receiving unit being remotely located relative to said transmitting unit;
a gain medium having a first and a second surface, the distance between any two opposing points on opposite edges of said second surface being more than the distance between said first and second surfaces, said gain medium being disposed between said retroreflectors with its first surface in close proximity to said first retroreflector, such that radiation can be amplified by said gain medium and emitted from said second surface of said laser gain medium over a wide range of angles; and
an element for extracting part of the radiation reflected between said retro reflectors and for utilizing said extracted radiation.

23. A system according to claim 22 and wherein said second retroreflector is partially reflective, and wherein said element is a power detector disposed in said receiving unit for enabling utilization of that part of said radiation received from said transmitting unit and not reflected by said partially reflective retro reflector.

24. A system according to claim 22 and wherein said second retroreflector is a full reflector, and said element is a partially transmissive power detector disposed at the incident surface of said full retroreflector.

25. A system according to claim 22 and wherein at least one of said transmitting unit and said receiving unit further comprises a detector for measuring the amount of radiation received, said detector being operative to perform at least one of the decoding of data and the increasing of the safety of the system.

26. A system according to claim 25 and wherein said increased safety of said system is achieved by utilizing said detector to detect a change in the level of radiation outside of the optical path between said transmitting and said receiving units.

27. A system according to claim 22 and wherein at least one of said transmitting and receiver units has an optical aperture, and also comprises at least one beam blocking surface positioned so that reflections from a beam entering said optical aperture are blocked by said at least one beam blocking surface.

28. A system according to claim 27 and wherein said optical aperture has a limited field of view such that it enables entry only of incident beams having an angle of incidence such that reflections of said incident beams impinge on one of said at least one beam blocking surface.

29. A wireless optical power transmitter comprising:
a laser gain medium having first and second surfaces, the distance between any two opposing points on opposite edges of said second surface being more than the distance between said first and second surfaces; and
a retroreflector in optical association with said first surface of said laser gain medium,
wherein said transmitter is adapted to transmit said optical power amplified by said gain medium wirelessly from said second surface over a wide range of angles to a remote receiver unit.

30. A wireless optical power transmitter according to claim 29 wherein said gain medium emits light at wavelengths between 700 nm to 2500 nm.

31. A wireless optical power transmitter according to claim 29, and having an optical aperture, and further comprising at least one beam blocking surface positioned so that reflections from any beam entering said optical aperture will be blocked by said at least one beam blocking surface.

32. A wireless optical power transmitter according to claim 29 wherein the maximal power transmission capability is selected to be lower than the limit imposed by a predetermined class of laser product specifications.

33. A wireless optical power transmitter according to claim 29 and wherein said laser gain medium is modulated at a predetermined frequency, such that its gain is switched between a higher and a lower value at said modulation frequency, such that a receiver unit located at a characteristic distance from the transmitter unit such that the round trip optical transit time of radiation between said transmitting unit and said receiver unit is equal to the period associated with said modulating frequency, will have a more efficient optical coupling to said transmitting unit than a receiver located at another distance from said transmitting unit.

34. A wireless optical power transmitter according to claim 33 and wherein said receiver unit located at said characteristic distance from said transmitter unit is mode locked to said transmitting unit.

35. A wireless optical power transmitter according to claim 33 and wherein optical lasing is limited to between a predetermined receiver and said transmitting unit by either one of mode locking or by selection of said modulation frequency.

36. A system according to claim 1, wherein said gain medium has the form of a sheet or a slab, and wherein said front and rear surfaces are the largest surfaces of said sheet or slab.

37. A system according to claim 22, wherein said gain medium has the form of a planar sheet or a slab, and wherein said first and second surfaces are the largest surfaces of said sheet or slab.

38. A wireless optical power transmitter according to claim 29 wherein said gain medium has the form of a sheet or a slab, and wherein said first and second surfaces are the largest surfaces of said sheet or slab.

39. A wireless optical power transmitter according to claim 29 wherein said gain medium has the form of a sheet or a slab and wherein said first and second surfaces are planar, parallel to one another and have the largest area of any surface of the sheet or slab.

* * * * *